United States Patent
Doi et al.

(10) Patent No.: US 9,622,146 B2
(45) Date of Patent: Apr. 11, 2017

(54) TRANSMITTING APPARATUS, RECEIVING APPARATUS, MANAGING APPARATUS, AND COMPUTER READABLE MEDIUM

(71) Applicant: KABUSHIKI KAISHA TOSHIBA, Minato-ku (JP)

(72) Inventors: Yusuke Doi, Yokohama (JP); Yoshihiro Oba, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 39 days.

(21) Appl. No.: 14/477,237

(22) Filed: Sep. 4, 2014

(65) Prior Publication Data

US 2015/0071217 A1    Mar. 12, 2015

(30) Foreign Application Priority Data

Sep. 6, 2013 (JP) ................................. 2013-185030

(51) Int. Cl.
*H04W 4/00* (2009.01)
*H04W 40/22* (2009.01)
(Continued)

(52) U.S. Cl.
CPC ........... *H04W 40/22* (2013.01); *H04L 12/189* (2013.01); *H04W 40/02* (2013.01); *H04W 40/24* (2013.01); *H04W 84/18* (2013.01); *H04L 45/122* (2013.01)

(58) Field of Classification Search
CPC ..... H04W 40/22; H04W 84/18; H04W 40/02; H04W 40/24; H04L 12/189; H04L 45/122
(Continued)

(56) References Cited

U.S. PATENT DOCUMENTS 8,948,046 B2 * 2/2015 Kang ..................... H04L 45/20
370/248
9,031,550 B2 * 5/2015 Buracchini ........... H04W 8/245
455/418
(Continued)

FOREIGN PATENT DOCUMENTS

JP          2010-226326       10/2010
JP          2013-55451         3/2013

OTHER PUBLICATIONS

Levis et al., "The Trickle Algorithm", Internet Engineering Task Force, Standards Track, ISSN: 2070-1721, Mar. 2011, pp. 1-13.

*Primary Examiner* — Chuong T Ho
(74) *Attorney, Agent, or Firm* — Oblon, McClelland, Maier & Neustadt, L.L.P.

(57) ABSTRACT

A transmitting apparatus includes a first communicator, a designator, and a second communicator. The first communicator sends out a message by wireless broadcast communication to plural first communication apparatus, being located within a wireless communication range of the first communicator, of plural communication apparatus that have a wireless broadcast communication function and that constitute a wireless multi-hop network. The designator designates a second communication apparatus that is located outside the wireless communication range of the first communicator and that can establish a first communication channel, from among the plural communication apparatus having a the wireless broadcast communication function. The second communicator is wider in a communication range than the first communicator. The second communicator establishes the first communication channel with the second communication apparatus designated by the designator. The second communicator sends out the message over the established first communication channel.

9 Claims, 12 Drawing Sheets

(51) Int. Cl.
  *H04W 40/02*   (2009.01)
  *H04W 40/24*   (2009.01)
  *H04W 84/18*   (2009.01)
  *H04L 12/18*   (2006.01)
  *H04L 12/733*  (2013.01)

(58) Field of Classification Search
  USPC ....... 370/390, 389, 392, 329, 328, 330, 254, 370/248, 249
  See application file for complete search history.

(56) References Cited

U.S. PATENT DOCUMENTS

| | | | | |
|---|---|---|---|---|
| 2008/0267116 A1* | 10/2008 | Kang | ............... | H04L 45/20 370/328 |
| 2009/0043889 A1* | 2/2009 | Gobara | ............ | H04L 29/12509 709/225 |
| 2009/0067367 A1* | 3/2009 | Buracchini | .......... | H04W 8/245 370/328 |
| 2009/0227282 A1* | 9/2009 | Miyabayashi | ...... | H04L 63/0492 455/552.1 |
| 2012/0045005 A1* | 2/2012 | Kim | ................. | H04W 52/0216 375/260 |
| 2014/0155031 A1* | 6/2014 | Lee | ........................ | G06F 21/35 455/411 |
| 2014/0185507 A1* | 7/2014 | Kim | ................. | H04W 52/0216 370/311 |
| 2014/0204757 A1 | 7/2014 | Ishizaki | | |
| 2014/0269704 A1* | 9/2014 | Alexander | .............. | H04W 4/06 370/390 |
| 2014/0344500 A1* | 11/2014 | Harriman | ............ | G06F 13/4022 710/316 |
| 2015/0049660 A1* | 2/2015 | Kwon | ............... | H04W 52/0235 370/311 |
| 2015/0139034 A1* | 5/2015 | Kang | ..................... | H04L 45/20 370/254 |
| 2015/0156720 A1* | 6/2015 | Kim | ................. | H04W 52/0216 370/311 |
| 2015/0156721 A1* | 6/2015 | Kim | ................. | H04W 52/0216 370/311 |
| 2015/0163742 A1* | 6/2015 | Kwon | ............... | H04W 52/0235 370/311 |
| 2016/0119872 A1* | 4/2016 | Kim | ................. | H04W 52/0216 370/311 |
| 2016/0255586 A1* | 9/2016 | Kwon | ............... | H04W 52/0235 370/311 |

* cited by examiner

FIG. 4A

| LINK LAYER HEADER (e.g., 802.15.4) SRC = MAC ADDRESS OF FIRST COMMUNICATOR OF HOP TRANSMISSION SOURCE DST = BROADCAST ADDRESS |
|---|
| IP LAYER HEADER-1 (INCLUDING 6LoWPAN) SRC = IP ADDRESS OF FIRST COMMUNICATOR OF TRANSMITTING APPARATUS DST = BROADCAST ADDRESS |
| PAYLOAD TRANSPORT LAYER HEADER AND MESSAGE BODY |

FIG. 4B

| LINK LAYER HEADER (e.g., 802.15.4) SRC = MAC ADDRESS OF FIRST COMMUNICATOR OF HOP TRANSMISSION SOURCE DST = BROADCAST ADDRESS |
|---|
| IP LAYER HEADER-1 (INCLUDING 6LoWPAN) SRC = IP ADDRESS OF FIRST COMMUNICATOR OF TRANSMITTING APPARATUS DST = ARBITRARY MULTICAST ADDRESS |
| PAYLOAD TRANSPORT LAYER HEADER AND MESSAGE BODY |

FIG. 4C

| LINK LAYER HEADER (e.g., 802.15.4) SRC = MAC ADDRESS OF FIRST COMMUNICATOR OF HOP TRANSMISSION SOURCE DST = MAC ADDRESS OF HOP PATH TO SECOND COMMUNICATION APPARATUS 30 |
|---|
| IP LAYER HEADER-2 (INCLUDING 6LoWPAN) SRC = IP ADDRESS OF FIRST COMMUNICATOR OF TRANSMITTING APPARATUS DST = IP ADDRESS OF FIRST COMMUNICATOR OF SECOND COMMUNICATION APPARATUS |
| UDP HEADER DESTINATION PORT: L2TP RECEPTION PORT OF SECOND COMMUNICATION APPARATUS |
| L2TP HEADER |
| PPP HEADER |
| IP LAYER HEADER-1 (INCLUDING 6LoWPAN) SRC = IP ADDRESS OF FIRST COMMUNICATOR OF TRANSMITTING APPARATUS DST = MULTICAST ADDRESS OR BROADCAST ADDRESS |
| PAYLOAD TRANSPORT LAYER HEADER AND MESSAGE BODY |

EXAMPLE OF CONNECTION TOPOLOGY

TRANSMITTING APPARATUS, RECEIVING APPARATUS, MANAGING APPARATUS, AND COMPUTER READABLE MEDIUM

CROSS-REFERENCE TO RELATED APPLICATION(S)

The present disclosure claims priority to Japanese Patent Application No. 2013-185030, filed on Sep. 6, 2013, which is incorporated herein by reference in its entirety.

FIELD

Embodiments described herein relate generally to a transmitting apparatus, a receiving apparatus, a managing apparatus, and a computer readable medium.

RELATED ART

Ad hoc networks in which wireless communication terminals are connected directly to each other to establish a network are known as one form of wireless network. Also, wireless multi-hop networks are one type of ad hoc networks. In wireless multi-hop networks, a message can be delivered to each wireless communication terminal on the network in such a manner that a message sent out from a start point wireless communication terminal is transferred sequentially between wireless communication terminals adjacent to each other. That is, in wireless multi-hop networks, wireless communication terminals also serve as relay apparatus.

In wireless multi-hop networks, each wireless communication terminal can distribute a message by wireless broadcast communication (wireless broadcasting or wireless multicasting). If plural wireless communication terminals that have received messages from a single wireless communication terminal distribute the message by wireless broadcast communication simultaneously, message congestion may occur. This may cause an event that wireless communication terminals cannot receive messages due to contention between message transmissions.

One method for avoiding such message congestion is to make scheduling so that individual wireless communication terminals on a wireless multi-hop network distribute messages by wireless broadcast communication at different timings. In this method, each wireless communication terminal stands by for a prescribed time after reception of a message and then sends out the message. Therefore, it may take an unduly long time for the message to be transmitted from a start point communication terminal to an end point one particularly in the case where the network scale is large.

BRIEF DESCRIPTION OF THE DRAWINGS

FIGS. 4A to 4C show the structures of example packets of a message according to the first exemplary embodiment;

DETAILED DESCRIPTION

Figure 1:
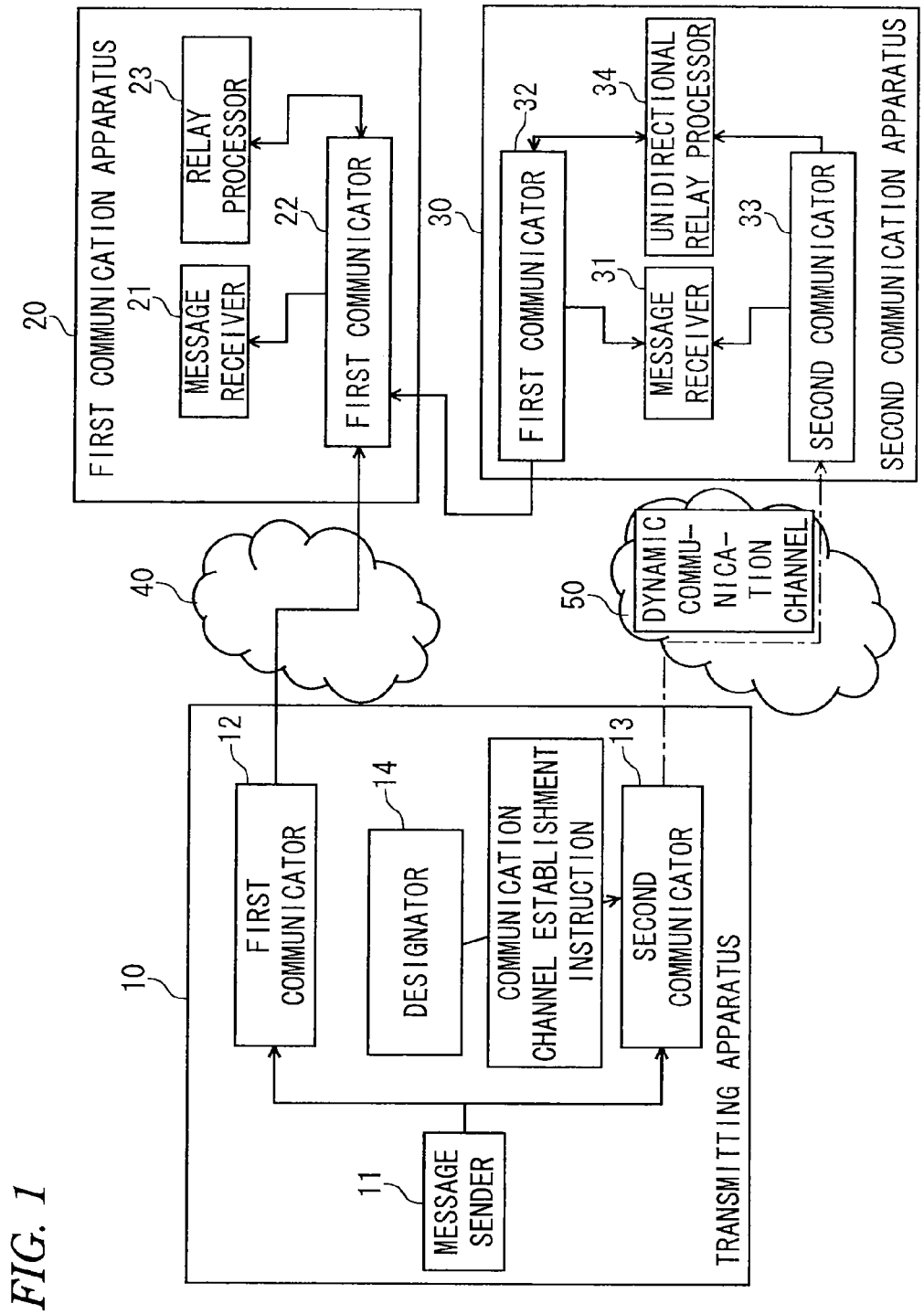
FIG. 1 is a block diagram of a communication system according to a first exemplary embodiment of the invention.

Various exemplary Embodiments will be hereinafter described with reference to the accompanying drawings. The same elements are given the same reference symbol in the drawings, and redundant description thereon will be omitted.

According to one exemplary embodiment, a transmitting apparatus includes a first communicator, a designator, and a second communicator. The first communicator sends out a message by wireless broadcast communication to plural first communication apparatus, being located within a wireless communication range of the first communicator, of plural communication apparatus that have a wireless broadcast communication function and that constitute a wireless multi-hop network. The designator designates a second communication apparatus that is located outside the wireless communication range of the first communicator and that can establish a first communication channel, from among the plural communication apparatus having a the wireless broadcast communication function. The second communicator is wider in a communication range than the first communicator. The second communicator establishes the first communication channel with the second communication apparatus designated by the designator. The second communicator sends out the message over the established first communication channel.

<First Exemplary Embodiment>

FIG. 1 is a block diagram of a communication system according to a first exemplary embodiment of the invention. The communication system shown in FIG. 1 corresponds to a part of nodes of a multi-hop network shown in FIG. 2. A node N0 shown in FIG. 2 corresponds to a transmitting apparatus 10 shown in FIG. 1. Also, each node N1 shown in FIG. 2 correspond to a second communication apparatus 30 shown in FIG. 1. Each of the other nodes shown in FIG. 2 corresponds to the second communication apparatus 30 or a first communication apparatus 20 shown in FIG. 1. In the following description, a term "communication apparatus" will be used to refer to the first communication apparatus 20 or the second communication apparatus 30.

As shown in FIG. 1, the communication system is provided with the transmitting apparatus 10, the first communication apparatus 20, and the second communication apparatus 30. Although only one first communication apparatus 20 and only one second communication apparatus 30 are shown in FIG. 1, actually a wireless multi-hop network is established so as to include a large number of first communication apparatus 20 and a large number of second communication apparatus 30 as indicated by the nodes in FIG. 2.

Figure 2:
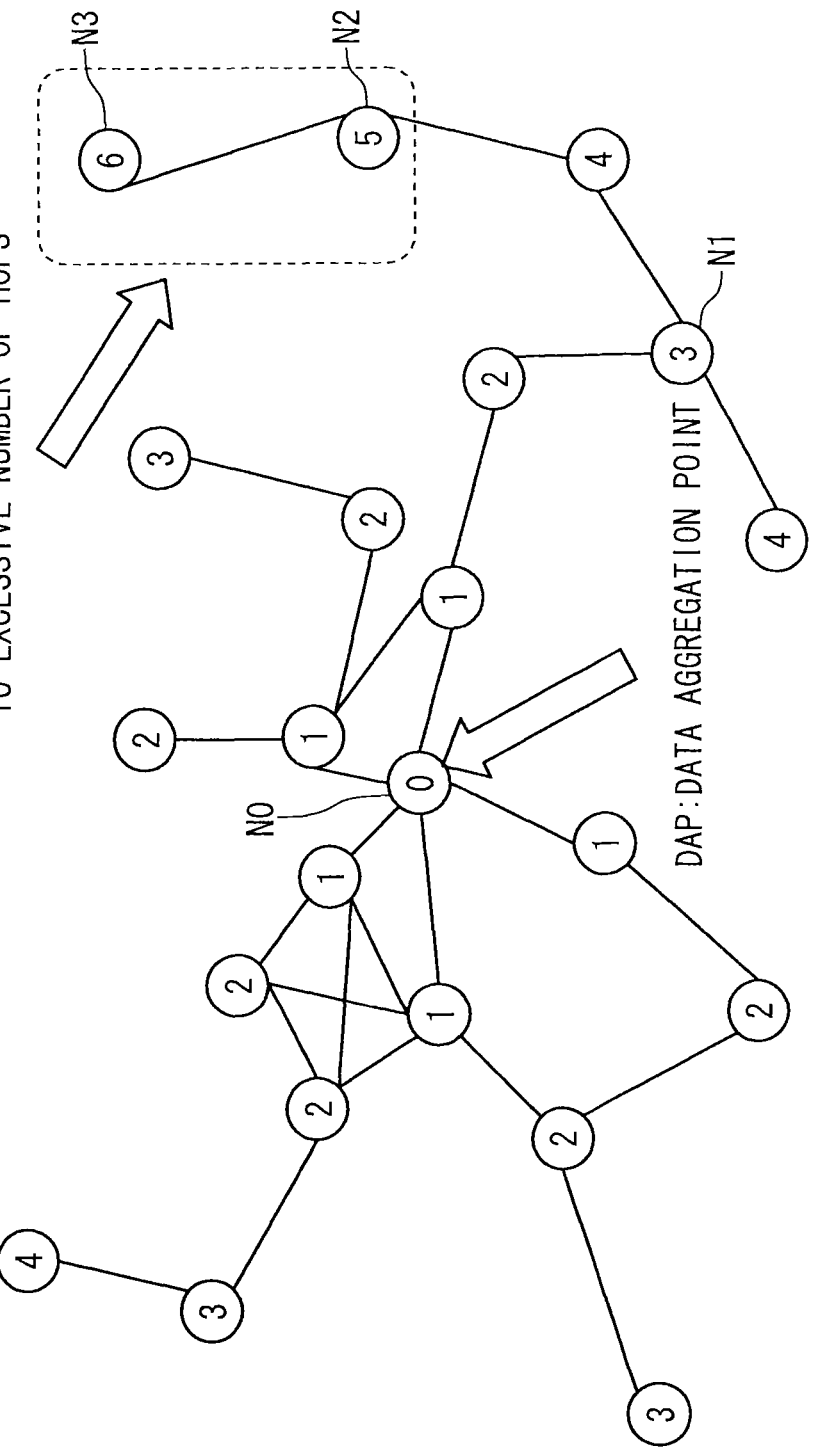
FIG. 2 is a schematic diagram of a wireless multi-hop network according to the first exemplary embodiment.

In the wireless multi-hop network shown in FIG. 2, a message sent out from the transmitting apparatus 10 can be delivered to each node on the wireless multi-hop network in such a manner that respective nodes (communication apparatus) transfer the message sequentially. A message is transferred sequentially by nodes in order of label numbers given to the nodes. For example, a message is transferred from node 0 to node 1 and then from node 1 to node 2. Since a message is transferred by wireless broadcast communication (wireless broadcasting or wireless multicasting), the message can be transferred from one node to plural nodes within a communication range. Each node (communication apparatus) on the wireless multi-hop network has a wireless broadcast communication function. The wireless broadcast communication function is a function of sending out a received message by wireless broadcast communication.

The first communication apparatus 20 has a single communicator (first communicator 22). The second communication apparatus 30 has plural communicators (first communicator 32 and second communicator 33). A first network 40 shown in FIG. 1 is a wireless multi-hop network. A second network 50 is a network including a communication channel (e.g., TCP session, PPP (point-to-point protocol) session, or L2TP (layer 2 tunneling protocol) tunnel that is established between particular terminals. The first network 40 is created by a first communicator 12 or the first communicator 22. The second network 50 shown in FIG. 1 is a network that is created as a result of establishment of a communication channel by a second communicator 13 of the transmitting apparatus 10 and the second communicator 33 of the second communication apparatus 30.

As shown in FIG. 1, the transmitting apparatus 10 includes a message sender 11, the first communicator 12, the second communicator 13, and a designator 14. Each element of the transmitting apparatus 10 shown in FIG. 1 may be implemented as a dedicated chip in which its function is preprogrammed or may be a function that is implemented when an information processing device such as a CPU (central processing unit) reads a program from a storage device such as a ROM (read-only memory) or a RAM (random access memory) and runs the program.

The message sender 11 sends out a message when receiving an instruction via a management interface, a timer-based periodic transmission instruction, an RPC (remote procedure call) transmission instruction that is received from, for example, another service, or the like. The message is sent out to the first network 40 via the first communicator 12. The message is also sent out to the second network 50 via the second communicator 13.

The first communicator 12 sends out, by broadcasting or multicasting, the message received from the message sender 11 to one or plural communication apparatus that are located within a wireless communication range of the first communicator 12 among the plural communication apparatus constituting the wireless multi-hop network. For example, message transmission by broadcasting can be realized by sending a packet having a header in which a designation address indicates all communication apparatus. For example, message transmission by multicasting can be realized by sending a packet having a header that designates all communication apparatus meeting a particular condition. FIGS. 4A and 4B show an example broadcast packet and an example multicast packet, respectively.

In each of FIGS. 4A and 4B, a payload includes a message body and a transport layer header (in general, UDP header). For example, the message body is a highly emergent message (e.g., emergency power saving request) issued by an administrator. Contents of the payload are application-specific. The packet shown in FIG. 4A includes, in addition to the payload, a 802.15.4 link layer header, for example, and an IP layer (e.g., IPv6 or 6LoWPAN: RFC 4944) header. In each of the link layer header and the IP layer header, a destination address is a broadcast address indicating all nodes. The link layer header contains a destination (DST (destination address)) of each hop (adjacent node) and a transmission source (SRC (source address)). The IP layer header contains a destination (DST) and a transmission source (SRC) in the entire multicast network. The packet shown in FIG. 4B is an example in which a multicast address is used as an IP layer address. In the case of broadcasting, an IPv6 destination address can be expressed as "ff01::0." On the other hand, where all routers are designated as destinations (terminal nodes are excluded) in multicasting, it is prescribed that the IPv6 designation address be "ff01::2." In IPv6, multicasting is handled substantially in the same manner as broadcasting except in routing.

In this exemplary embodiment, the first communicator 12 can send out a message to nodes 1 shown in FIG. 2. Nodes that are located within a wireless communication range of the first communicator 12 will be referred to as "adjacent nodes." The wireless communication range of the first communicator 12 is a range that can be reached directly by radio waves of a wireless signal sent out from the first communicator 12. For example, radio waves sent out from the first communicator 12 can directly reach a range having a radius of about 100 m. A region that is within such a distance range but cannot be reached by radio waves due to presence of a shield object or the like is excluded from the wireless communication range. In the example of FIG. 2, for example, nodes 1 are adjacent nodes to node 0. Adjacent nodes to each node 1 are node 0 and nodes 2. Adjacent nodes to each node 2 are nodes 1 and nodes 3. In the wireless multi-hop network shown in FIG. 2, a message can be transferred throughout the network when the message is transferred between nodes adjacent to each other (specifically, from node 0 to nodes 1 and from each node 1 to adjacent nodes 2). A message can be transferred between nodes adjacent to each other also in the opposite direction (i.e., from node 4 to node 3, from node 3 to node 2, and from node 2 to node 1).

Figure 3:
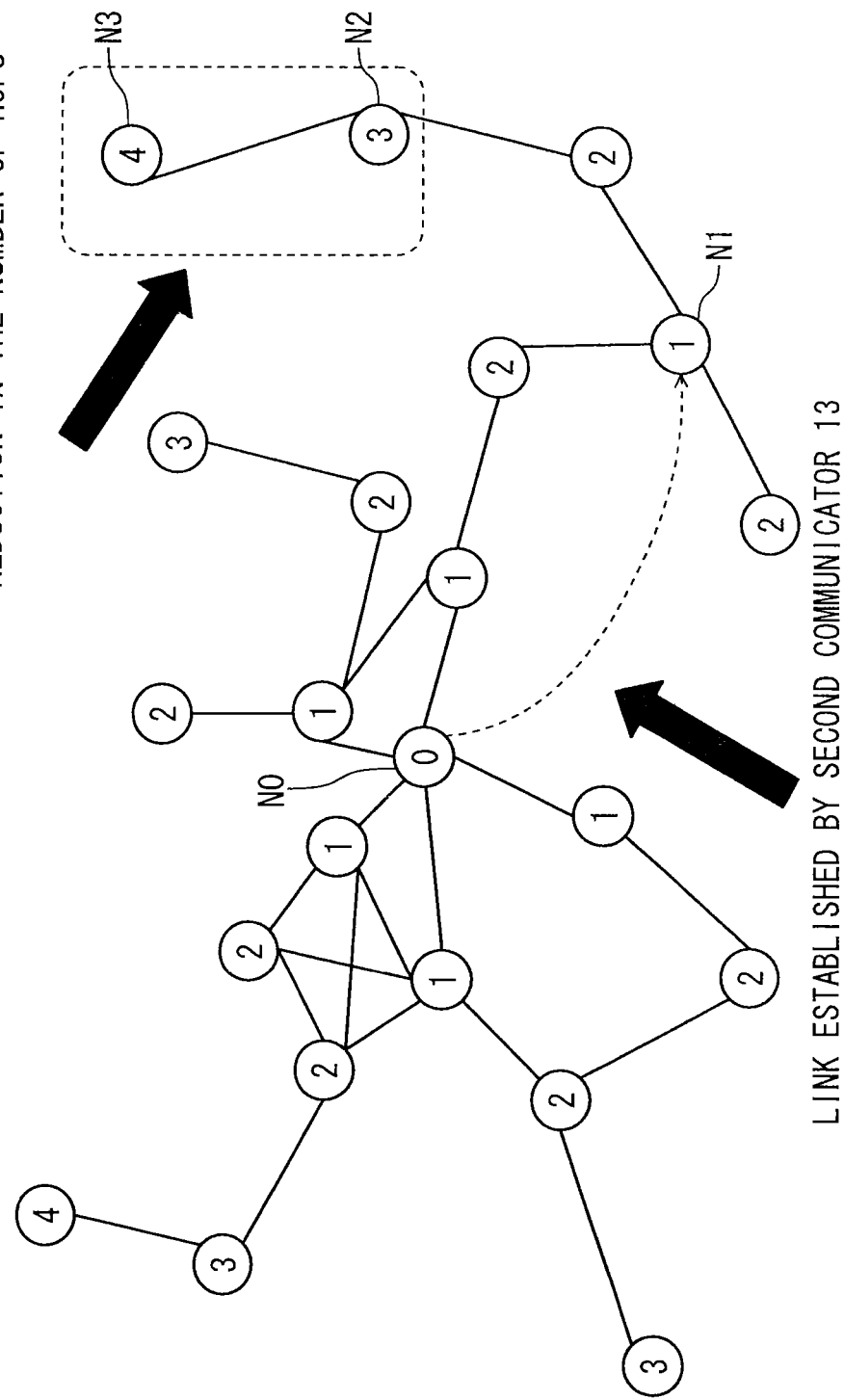
FIG. 3 is a schematic diagram showing the configuration of a wireless multi-hop network in a case where a communication channel is established by a second communicator 13 shown in FIG. 1.

The second communicator 13 is wider in communication range than that of the first communicator 12. The second communicator 13 establishes a communication channel with a communication apparatus that is designated by the designator 14 among the plural communication apparatus constituting the wireless multi-hop network. The second communicator 13 sends out a message using the thus-established communication channel. Examples of the communication channel include a TCP session, a PPP (point-to-point protocol) session, and an L2TP (layer 2 tunneling protocol) tunnel. As shown in the example of FIGS. 2 and 3, in this exemplary embodiment, a communication channel from node N0 to node N1 is established. A communication apparatus with which the second communicator 13 can establish a communication channel is one having a communicator that can establish a communication channel with the second communicator 13. In the example of FIG. 1, the second communication apparatus 30 which has the second communicator 33 is such a communication apparatus. The second communicator 13 has different properties from the first communicator 12. More specifically, the second communicator 13 has a wider communication range than the first communicator 12. Furthermore, whereas the first communicator 12 performs wireless broadcast communication, the second communicator 13 can establish a communication channel dynamically with a counterpart apparatus with which the second communicator 13 can establish a communication channel, and performs a one-to-one communication. For example, the second communicator 13 is implemented by a 3G network, a 4G network, or LTE (long term evolution). The second communicator 13 can also be implemented by a virtual link on the first communicator 12.

The reason why the second communicator 13 has a wider communication range than the first communicator 12 will be described below. For example, where the second communicator 13 is implemented by a 3G network, the second communicator 13 sends out a message to a destination communication apparatus via a base station (not shown). Since the second communicator 13 can communicate with communication apparatus that are located in a range covered by the base station, the second communicator 13 has a wide communication range. On the other hand, where the second communicator 13 is implemented by a virtual link on the first communicator 12, the second communicator 13 sends out an encapsulated packet in which a header designates a destination communication apparatus (see FIG. 4C). Such encapsulated packet can be transmitted to an address that is designated in the packet as the destination via plural adjacent communication apparatus. Such encapsulated packet is not subjected to a congestion control which is usually done in multi-hop networks until reaching the designated destination (which will be described later in detail). Therefore, in the case where the second communicator 13 is implemented by a virtual link on the first communicator 12a, a message can reach a distant destination fast.

FIG. 4C shows an example encapsulated packet for the case where L2TP (RFC 2611) tunneling is used. In the transmitting apparatus 10 shown in FIG. 1, the message sender 11 generates a payload and inputs the payload to the first communicator 12 and the second communicator 13. The first communicator 12 sends out a message as shown in FIG. 4A so that the message is to be received by all nodes. On the other hand, as shown in FIG. 4C, the second communicator 13 adds, at its entrance, to the payload an IP layer header-1 in which a destination is a broadcast address and further adds a PPP header and an L2TP header. In order to deliver the resulting combination to the second communication apparatus 30 utilizing the first communicator 12, the second communicator 13 further adds a link layer header, an IP layer header-2, and a UDP header thereto. The first communicators of communication apparatus located between the transmitting apparatus 10 and the second communication apparatus 30 transfer the packets of FIG. 4C to the second communication apparatus 30 by performing ordinary IP processing (according to a destination address designated by the LP layer header-2). Since this transfer processing is conducted in accordance with the ordinary IP stack processing, this transfer processing causes no delay due to RFC6206: Trickle Algorithm. After the packet of FIG. 4C reaches the second communication apparatus 30, the header is removed according to a procedure that is prescribed in L2TP, and the IP layer header-1 and the payload are extracted. Since a destination of the IP layer header-1 is a broadcast address or a multicast address, the second communication apparatus 30 adds a link layer header thereto according to the ordinary IP stack process. The resulting packet which is in a form equivalent to that shown in FIG. 4A is re-transmitted from the first communicator 32 of the second communication apparatus 30 by wireless multicasting. At this time, a unidirectional relay processor 34 always relays and re-transmits a message from the first communicator 32 irrespective of whether the message is input from the first communicator 32 or the second communicator 33, so long as a prescribed condition is met. Therefore, even if a message happens to earlier reach the second communication apparatus 30 first without going through the second communicator 33, the message will not travel the communication channel of the second communicator 33 in the reverse direction. Details of the unidirectional relay processor 34 will be described later. Although FIG. 4C shows the example in which L2TP tunneling is used, establishing the second communicator 13 on the first communicator 12 as a virtual communication channel may use a TCP session, transfer processing in the application layer, or the like.

The designator 14 designates a communication apparatus with which the second communicator 13 is to establish a communication channel, and issues a communication channel establishment instruction to the second communicator 13. The designator 14 selects, as a communication apparatus which establishes a communication channel, a communication apparatus which actually establishes a communication channel with the second communicator 13 from among a set of communication apparatus each having a communicator that can establish a communication channel with the second communicator 13. The designator 14 designates, as a second communication apparatus, a communication apparatus that is located outside the wireless communication range of the first communicator 12. There are plural methods for designating a communication apparatus with which the second communicator 13 is to establish a communication channel. The phrase "outside the wireless communication range of the first communicator 12" means, for example, outside a range in which radio waves of a wireless signal emitted from the first communicator 12 directly reach. For example, where radio waves emitted from the first communicator 12 directly reach a range having a radius of about 100 m, a range outside the range having the radius of 100 m is "outside the wireless communication range." A region that is within such a distance range but cannot be reached by radio waves due to presence of a shield object or the like is "outside the wireless communication range."

In a first method, the designator 14 designates a communication apparatus with which the second communicator 13 is to establish a communication channel, based on (i) a first upper limit time and (ii) a network topology, managed by the designator 14, of the wireless multi-hop network. The first upper limit time is an upper limit time to be taken for a message to reach a prescribed number (e.g., 98%) or more of communication apparatus among plural communication apparatus that constitute a wireless multi-hop network and that have the wireless communication function. The first upper limit time may be, for example, a time that is predetermined by an external administrator. For example, unidirectional delays are measured based on message reception times at which the respective communication apparatus receive a message on the multi-hop network, and a communication apparatus with which the second communicator 13 is to establish a communication channel is designated so that a maximum value of the unidirectional delays (or 98%-rank unidirectional delay) becomes equal to or smaller than a threshold value. The designator 14 manages the network topology of the wireless multi-hop network as shown in FIG. 2. The network topology includes nodes and links (communication channels) connecting the nodes. The designator 14 can manage a network topology status of the entire wireless multi-hop network by, for example, receiving from each node notices including information relating to node connection relationships, adjacent nodes, and the like when the wireless multi-hop network is constructed.

In a second method, the designator 14 designates a communication apparatus with which the second communicator 13 is to establish a communication channel, based on (i) a first upper limit number-of-apparatus and (ii) the network topology, managed by the designator 14, of the wireless multi-hop network. The first upper limit number-of-apparatus is an upper limit of the number of communication apparatus (the number of hops) that a message can go through until reaching a prescribed number or more of plural communication apparatus constituting the wireless multi-hop network. The first upper limit number-of-apparatus may be, for example, a number that is predetermined by an external administrator. For example, the designator 14 designates a communication apparatus with which the second communicator 13 is to establish a communication channel so that a maximum number of hops (or 98%-rank number of hops) in a case where the transmitting apparatus 10 is located at a center in a network topology constituted by nodes that perform wireless multi-hop communications becomes equal to or smaller than a threshold value. More specifically, the designator 14 rearranges the network topology in the form of a graph and designates a second communication apparatus 30 which is closer to a region in which the number of hops is larger than the threshold value as a communication apparatus with which the second communicator 13 is to establish a communication channel. It is assumed that the threshold value for the number of hops in the example of FIGS. 2 and 3 is four. In this case, numbers of hops of nodes N2 and N3 are larger than the threshold value "4." Then, a communication channel is established from node N0 to node N1 to thereby make the numbers of hops of nodes N2 and N3 be equal to or smaller than the threshold value "4."

In a third method, the designator 14 designates a communication apparatus that is located at a position corresponding to ⅔ of the maximum number of communication apparatus which a message goes through until reaching a prescribed number or more of communication apparatus among plural communication apparatus constituting a wireless multi-hop network. If the designator 14 designates a second communication apparatus 30 that is located at a position corresponding to ⅔ of the maximum number of hops and if the second communicator 13 establishes a communication channel with the designated second communication apparatus 30, the number of hops is minimized (in an area concerned, the maximum number of hops is reduced to ⅓). Thus, a communication channel may be formed by using this as an indicator.

In a fourth method, a second communication apparatus 30 is designated at random, the second communicator 13 establishes a communication path with the designated second communication apparatus 30, and then the hill climbing method or the like is performed so as to approach an optimum construction.

In a fifth method, an administrator or the like statistically sets a communication channel to be established by the second communicator 13.

Next, the first communication apparatus 20 will be described.

The first communication apparatus 20 includes a first communicator 22, a message receiver 21, and a relay processor 23.

The first communicator 22 receives a message that has been transmitted by wireless broadcast communication and supplies the received message to the message receiver 21. Furthermore, the first communicator 22 sends out the received message at a timing that is controlled by the relay processor 23.

The message receiver 21 thus receives the message via the first communicator 22. The relay processor 23 causes the first communicator 22 to send out the message after taking a radio congestion preventive measure such as RFC6206 (e.g., introduction of a random waiting time that is shorter than a prescribed time). For example, the relay processor 23 causes the first communicator 22 to stand by for a random period after reception of a message and to then send out the message. The message can be distributed throughout a wide wireless multi-hop communication network as a result of successive transfers of the message by its nodes (see FIG. 3) which operate like the first communicator 22 of the first communication apparatus 20. The relay processor 23 can also control the first communicator 22 so that (i) if a prescribed condition is met, the first communicator 22 stands by for a prescribed period and then sends out the message by the wireless broadcast communication and (ii) if the prescribed condition is not met, the first communicator 22 does not send out the message. The prescribed condition includes, for example, a condition that messages having the same contents have been received from other nodes only a number of times that is smaller than a prescribed number (e.g., a parameter k defined in RFC6206). This is because if such messages have been received the prescribed number or more of times, a sufficient number of messages have been sent to a region in interest (e.g., adjacent nodes) and it can be determined that there is less likely a node that has not received a message yet. On the other hand, if such messages have been received less than the prescribed number of times, it can be determined that there is highly likely a node that has not received a message yet, and hence the relay processor 23 causes sending of a message. With this control, congestion control can be performed more effectively. Details will be described in Example 2.

Next, the second communication apparatus 30 will be described.

The second communication apparatus 30 includes a message receiver 31, a first communicator 32, a second communicator 33, and a unidirectional relay processor 34.

The first communicator 32 receives a message that has been transmitted by the wireless broadcast communication and sends the received message to the message receiver 31. Furthermore, the first communicator 32 sends out the received message by the wireless broadcast communication at a timing that is controlled by the unidirectional relay processor 34.

if a communication channel has been established between the second communicator 33 and the second communicator 13, the second communicator 33 receives a message directly from the transmitting apparatus 10 over the established communication channel. The second communicator 33 sends the thus-received message to the message receiver 31.

The message receiver 31 receives a message via the first communicator 32 or the second communicator 33.

The unidirectional relay processor 34 causes the first communicator 32 to send out a message after taking a radio congestion preventive measure such as RFC6206 (e.g., introduction of a random waiting time that is shorter than a prescribed time). For example, the unidirectional relay processor 34 causes the first communicator 32 to stand by for a random period after reception of a message irrespective of whether the message has been received by the first communicator 32 or the second communicator 33 and to then send out the message by the wireless broadcast communication.

The unidirectional relay processor 34 can also control the first communicator 32 so that (i) if a prescribed condition is met, the first communicator 32 stands by for a prescribed period and then sends out the message by the wireless broadcast communication and (ii) if the prescribed condition is not met, the first communicator 32 does not send out the message. The prescribed condition include, for example, a condition that messages having the same contents have been received from other nodes only a number of times that is smaller than a prescribed number (e.g., a parameter k defined in RFC6206). On the other hand, the unidirectional relay processor 34 prohibits the second communicator 33 from sending out a message. This is because a communication counterpart of the second communicator 33 on the established communication channel is the transmitting apparatus 10 and it is not necessary to send out a message to the transmitting apparatus 10. Where the second communicator 33 is implemented by, for example, a 3G network, a communication charge may depend on an amount of communication. Therefore, prohibiting the second communicator 33 from sending out a message provides an advantage that charging for useless communications can be avoided.

Next, how the communication system according to the first exemplary embodiment operates will be described with reference to FIGS. 5 to 8.

Figure 5:
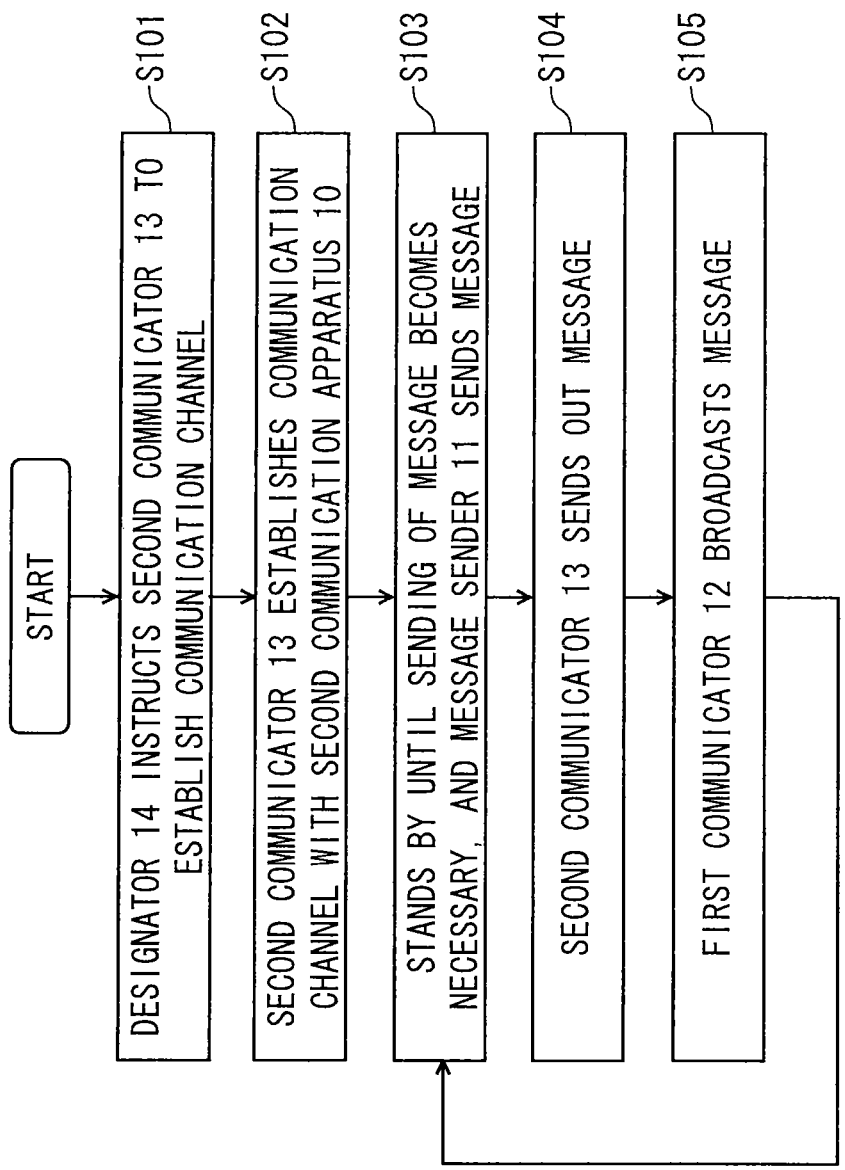
FIG. 5 is a flowchart showing how a transmitting apparatus 10 shown in FIG. 1 operates.
Figure 6:
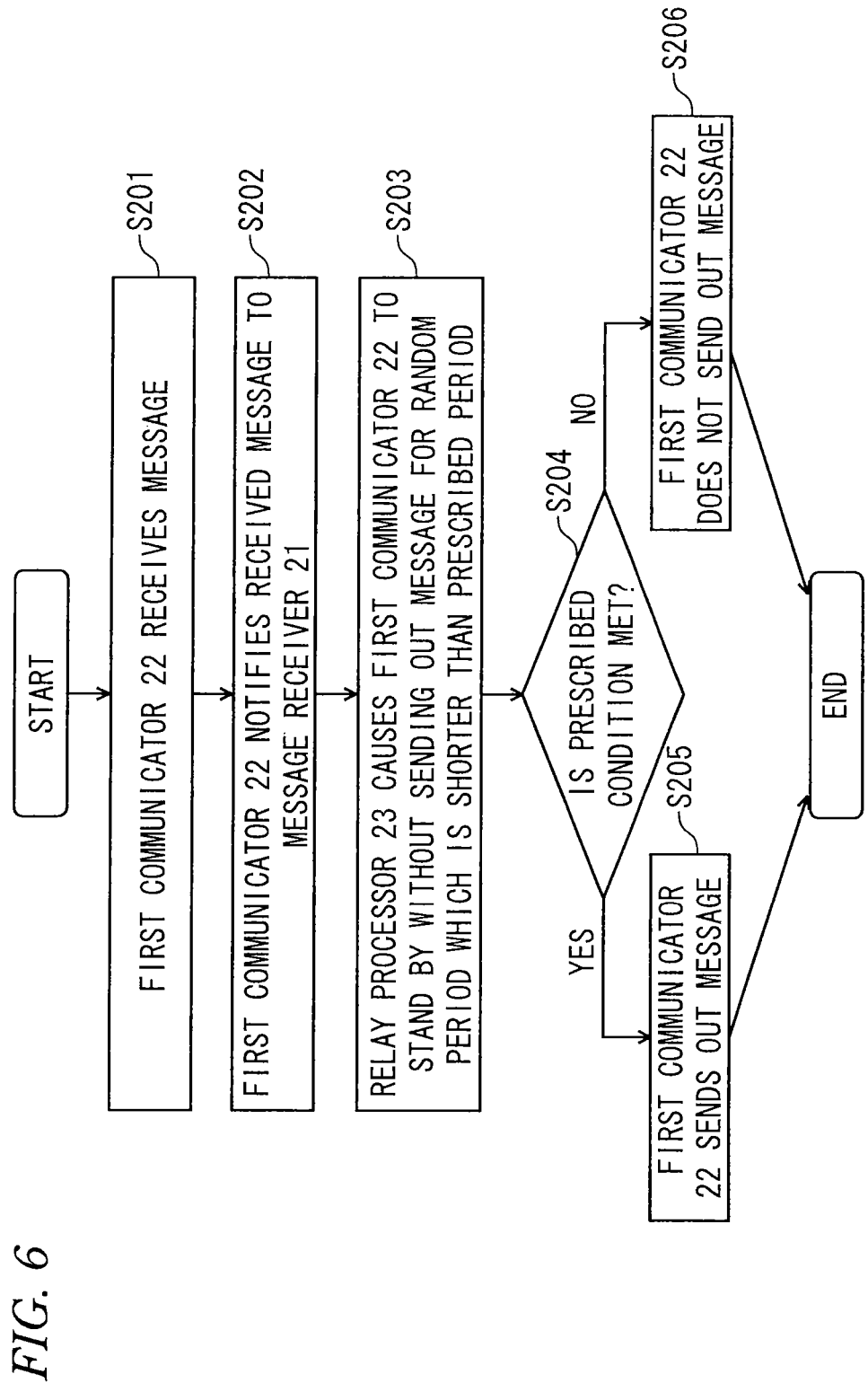
FIG. 6 is a flowchart showing how a first communication apparatus 20 shown in FIG. 1 operates.
Figure 7:
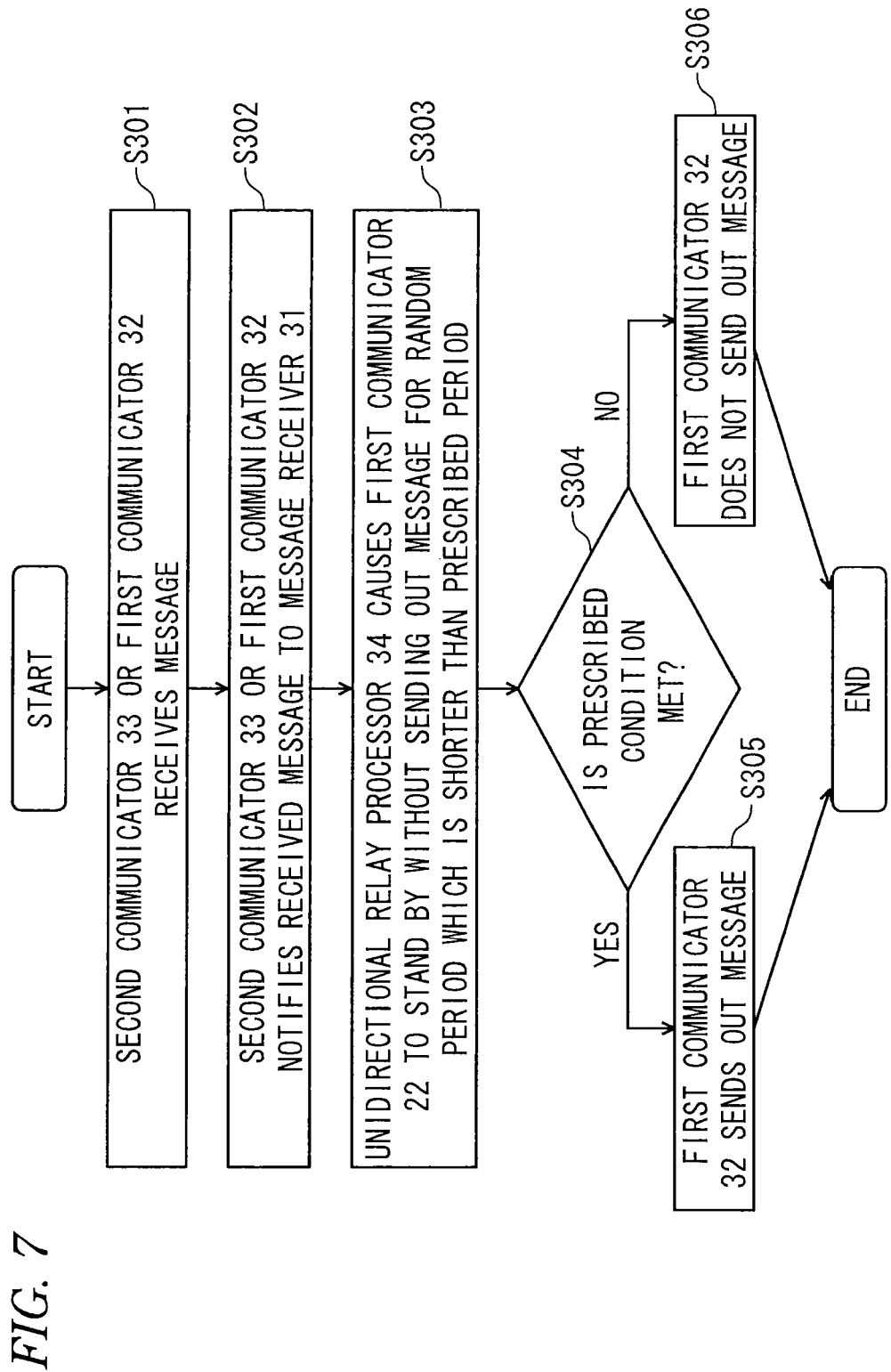
FIG. 7 is a flowchart showing how a second communication apparatus 30 shown in FIG. 1 operates.
Figure 8:
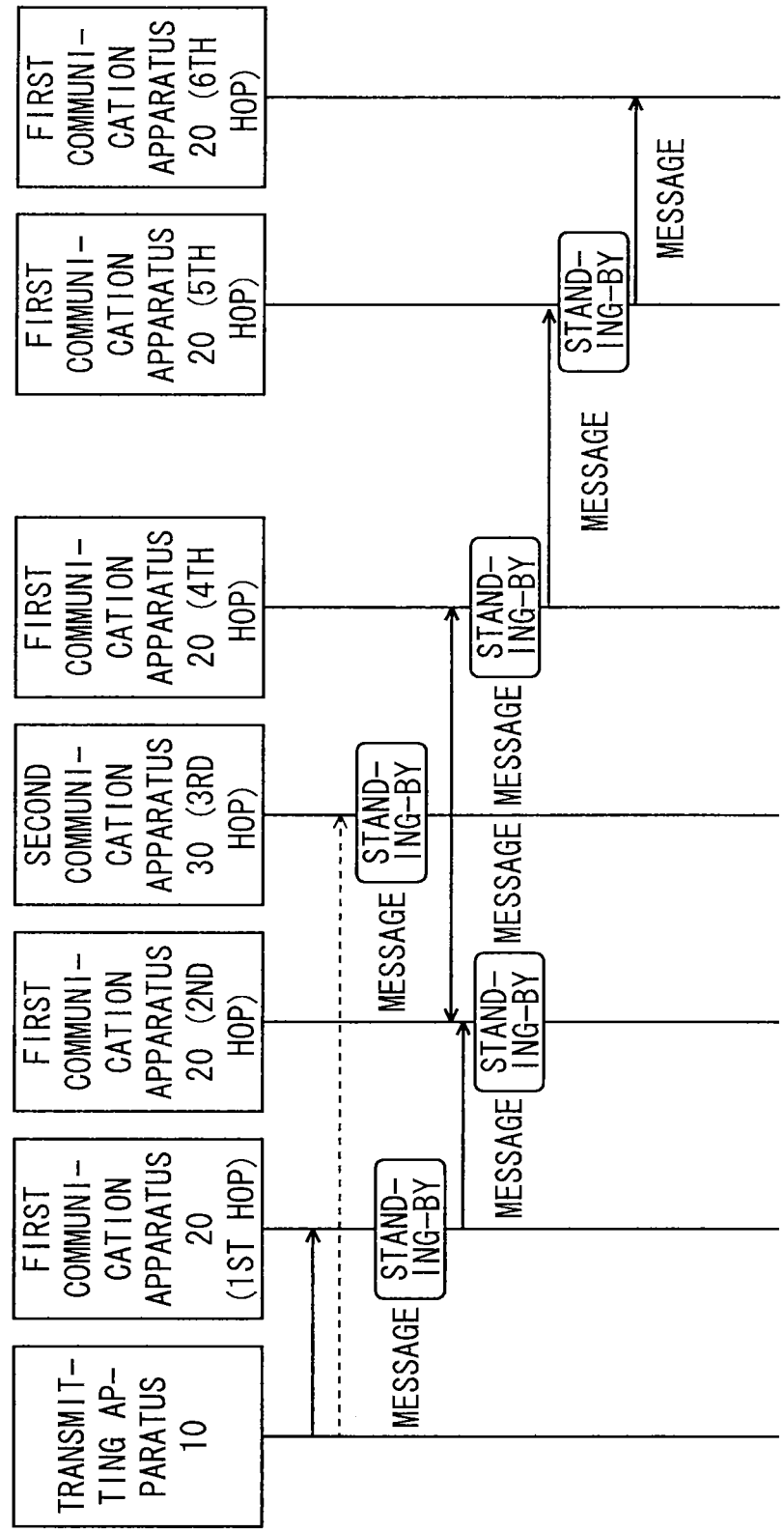
FIG. 8 is a sequence diagram showing how the communication system shown in FIG. 3 operates.

FIGS. 5 to 7 are flowcharts showing how the transmitting apparatus 10, the first communication apparatus 20, and the second communication apparatus 30 operate, respectively. FIG. 8 is a sequence diagram showing how the communication system according to the first exemplary embodiment operates.

As shown in FIG. 5, in the transmitting apparatus 10, at steps S101 and S102 the second communicator 13 establishes a communication channel with the second communication apparatus 30 in response to an instruction from the designator 14. At step S103, the message sender 11 sends a message at such a timing that sending of the message has become necessary due to an instruction from an administrator or the like. At step S104, the second communicator 30 sends out the message received from the message sender 11 to the second communication apparatus 30. At step S105, the first communicator 12 sends out the message received from the message sender 11 to an adjacent node(s) by broadcast communication. In the example of FIG. 2, the transmitting apparatus 10 corresponds to node 0 (N0), and the adjacent nodes correspond to nodes 1. Thereafter, the second communication apparatus 30 corresponds to node N1. Steps S103 to S105 are executed again when it becomes necessary to send out the message again. In the example of FIG. 5, the order of step S102, step S104, and step S105 may be changed.

As shown in FIG. 6, in the first communication apparatus 20, if the first communicator 22 receives a message at step S201, at step S202 the first communicator 22 notifies the received message to the message receiver 21. Then, at step S203, the relay processor 23 causes the first communicator 22 to stand by for a random period which is shorter than a prescribed period without sending out the message. After a lapse of the random period, if a prescribed condition is met (Yes at S204), at step S205 the first communicator 22 sends out the message by the wireless broadcast communication. If the prescribed condition is not met (No at S204), at step S206 the first communicator 22 does not send out the message. In the example of FIG. 2, if the first communication apparatus 20 is node 1, the first communication apparatus 20 sends out the message to a node(s) 2 that is adjacent to node 1. If the first communication apparatus 20 is node 2, the first communication apparatus 20 sends out the message to node 3 that is adjacent to node 2. In this manner, the message is transferred sequentially between nodes adjacent to each other, whereby the message can be distributed to the entire multi-hop network. It is noted that the message may also be transmitted from node 3 to node 2 or from node 2 to node 1.

As shown in FIG. 7, in the second communication apparatus 30, if the first communicator 32 or the second communicator 33 receives a message at step S301, at step S302 it communicates the received message to the message receiver 31. At step S303, the unidirectional relay processor 34 causes the first communicator 32 to stand by without sending out the message for a random period which is shorter than a prescribed period. After a lapse of the random period, if a prescribed condition is satisfied (S304: yes), at step S305 the first communicator 32 sends out the message by wireless broadcasting or multicasting. If the prescribed condition is not satisfied (S304: no), at step S306 the first communicator 32 does not send out the message. In the example of FIG. 3, the second communication apparatus 30 corresponds to node N1 and sends the message to nodes 2 that are adjacent to node N1.

As shown in FIG. 8, a message that has been sent out from the transmitting apparatus 10 is transferred by two methods. In the first method, the message is multi-hop-transferred between nodes adjacent to each other via the first communication apparatus 20 each of which stands by for a random period which is shorter than the prescribed period under the control of the relay processor 23. In the second method, the transmitting apparatus 10 establishes a direct communication channel with the second communication apparatus 30 which is located three hops away and sends out a message to the second communication apparatus 30. By combining the first method and the second method, the time taken to transmit the message from the start point to the end point can be shortened while congestion is avoided. In the example of FIG. 8, the second-hop first communication apparatus 20 receives the same messages from the first-hop first communication apparatus 20 and the third-hop second communication apparatus 30. In this case, the second-hop first communication apparatus 20 determines that a sufficient message has been transmitted to the adjacent node (third-hop node) and hence does not send out the message thereto. This contributes to efficient congestion control.

EXAMPLE 1

A specific example of how the communication system according to the first exemplary embodiment operates will be described using Example 1.

Example 1 of the first exemplary embodiment assumes such a configuration that in a wireless multi-hop network having a data aggregation point (DAP) which is 3G-connected to a central management system or the like, another node (other nodes) on the wireless multi-hop network is given a 3G interface (see FIG. 2) to prepare for a failure or the like of the data aggregation point. In FIG. 1, the data aggregation point corresponds to the transmitting apparatus 10. Each of the other nodes corresponds to the first communication apparatus 20 or the second communication apparatus 30. In the example of FIG. 2, at least node N1 corresponds to the second communication apparatus 30.

Referring to FIG. 2, assume that the limit number of hops (i.e., a limit number of communication apparatus which a messages goes through) of a demanded specification is four.

In this case, fifth-hop or farther nodes (i.e., nodes N2 and N3) do not meet the demanded specification in terms of the promptness of message transmission by means of the wireless broadcast communication.

Assume that the node labeled "N1" has both of a 3G interface (corresponding to the second communicator 33) and a wireless multi-hop interface (corresponding to the first communicator 32), that is, the node N1 correspond to the second communication apparatus 30 shown in FIG. 1. In this case, the number of hops to node N3 can be reduced by two by establishing a communication channel from the data aggregation point (second communicator 13) to the node N1 (see FIG. 3). As a result, the nodes N2 and N3 come to meet the requirement relating to the number of hops, and the entire network comes to meet the requirements.

Where the second communicator 13 is the 3G interface, the second communicator 13 may be either of always-on connection or not. Where the second communicator 13 is not of always-on connection, a communication channel may be established only when it is expected from monitoring of an application or an environment that a message will be issued soon (e.g., occurrence of tightness of power supply).

EXAMPLE 2

Next, description will be made on an example where a virtual link on the first communicator 12 is used as a communication channel of the second communicator 12 of the system according to the first exemplary embodiment. Also, description will be given on an example as to how the relay processor 23 and the unidirectional relay processor 34 operate with a radio congestion preventive measure such as RFC6206.

In Example 1, the example where the second communicator 13 employs 3G has been described. Example 2 is directed to a case where a communication channel of the second communicator 13 is a virtual link created on the first communicator 12.

Figure 9:
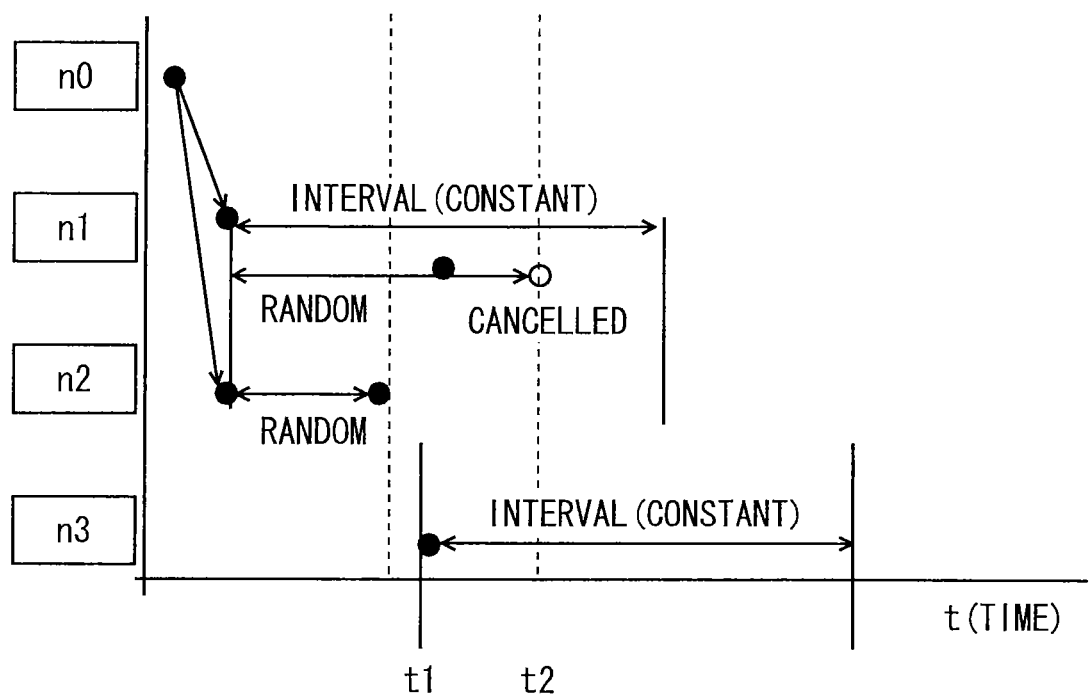
FIG. 9 illustrates congestion control.
Figure 10:
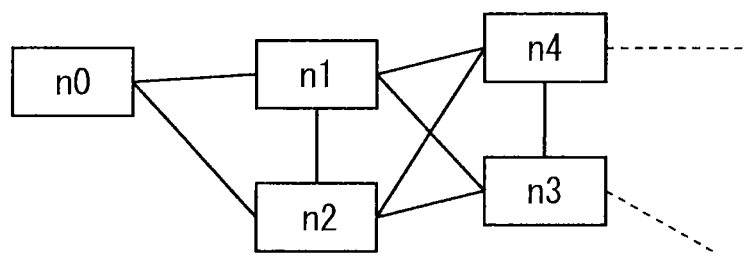
FIG. 10 is a schematic diagram showing a network topology including nodes shown in FIG. 9.

Since the first communicator 12 uses wireless multi-hop, it is expected that the RTT (round trip time) is longer than in wired networks due to congestion, contention, etc. in wireless sections. On the other hand, the maximum delay of the wireless broadcast communication with a normal radio congestion avoiding measure is a timer delay as shown in FIG. 9. For example, in the example of FIG. 9, assume that a message is sent out from node n0 in a topology shown in FIG. 10. The message directly reaches nodes that are located within a message reachable range. In this example, further assume that the message reaches nodes n1 and n2. To avoid congestion in wireless sections, each of nodes n1 and n2 sends out the message after stands by for a random number of seconds within a proper interval (this processing is controlled by the relay processor 23 in the first communication apparatus 20 and by the unidirectional relay processor 34 in the second communication apparatus 30). In the example of FIG. 9, node n1 stands by until time t2, and node n2 stands by until time t1. Then, node n2 informs node n1 that the message has already been sent out from itself. Receiving this message, node n1 does not send out the message. As a result, only node 2 transfers the message to node n3. Therefore, a delay of t1 (plus a transmission delay) occurs in the section from node n0 to node n3. The reason why the node n1 does not send out the message is to prevent transmission of the same messages to the same destination and thereby prevent congestion.

Now, assume that a virtual link to node n3 has been formed in the form of a tunnel or the like. In this case, no delay occurs from node n0 to n3 due to a radio congestion avoiding measure for wireless multicasting although wireless section transmission delay occurs. Establishing this virtual link using the second communicator 13 makes it possible to shorten the time taken to transmit a message from the start point communication terminal to an end point communication terminal without the need for using a costly network such as a 3G network. In this case, all communication apparatus that can create a virtual link are candidates for a destination of a link from the second communicator 13.

MODIFICATION EXAMPLE 1

Figure 11:
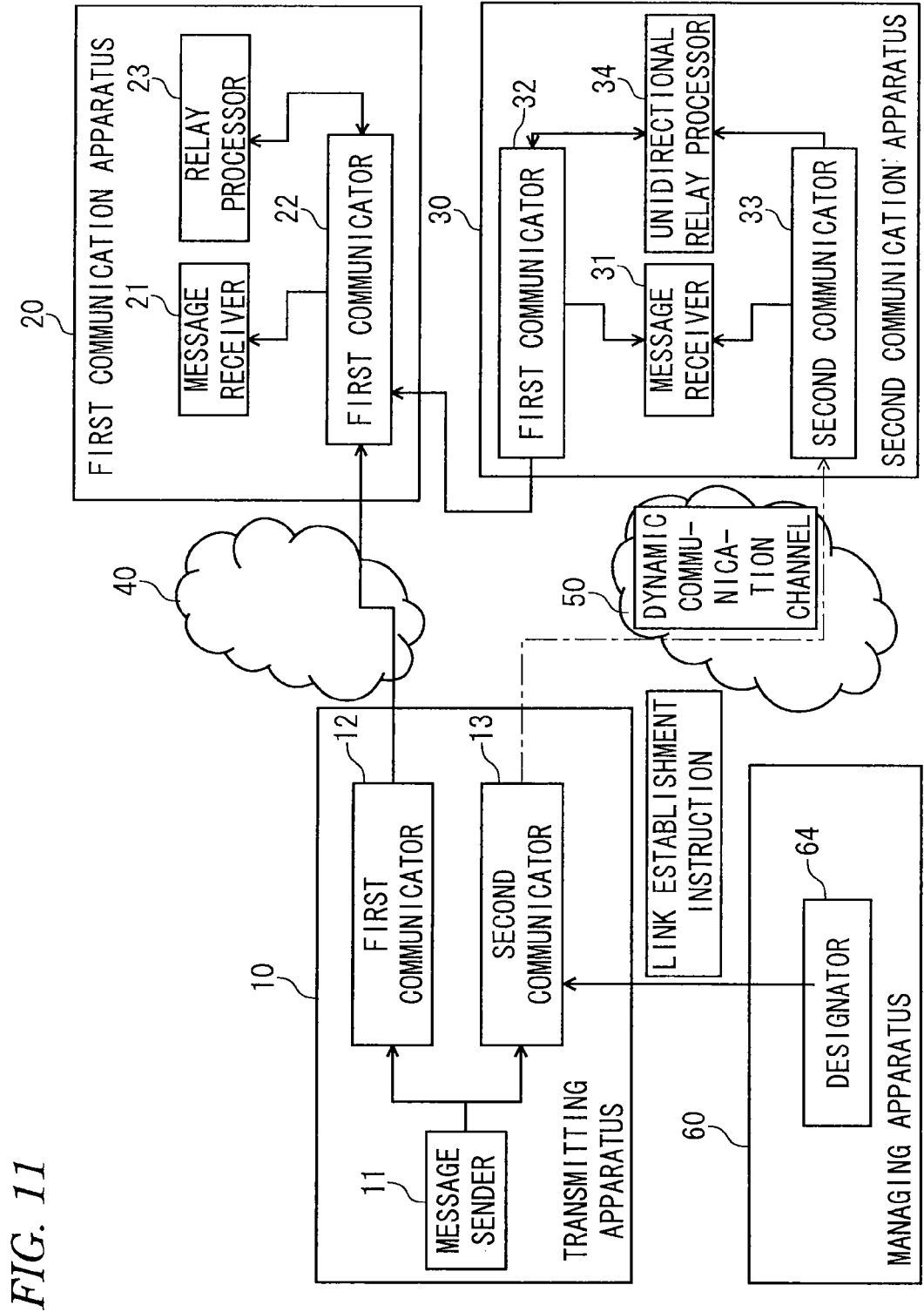
FIG. 11 is a block diagram of a communication system according to modification example 1 of the first exemplary embodiment.

FIG. 11 is a block diagram of a communication system according to Modification Example 1.

This communication system is different from that according to the first exemplary embodiment in that a transmitting apparatus 10' of Modification Example 1 does not include the designator 14 unlike the transmitting apparatus 10 of the first exemplary embodiment and that the communication system of the Modification Example 1 includes a managing apparatus 60 having a designator 64.

The designator 64 of the managing apparatus 60 has the same function as the designator 14 shown in FIG. 1 except that the designator 64 is disposed outside the transmitting apparatus 10'.

That is, the designator 64 designates, as a destination of a communication channel to be established, a communication apparatus that can establish a communication channel with the second communicator 13 of the communication apparatus 10' and that is located outside (e.g., farther than) a wireless communication range of the first communicator 12 of the communication apparatus 10'. Then, the designator 64 instructs the designated communication apparatus to establish a communication channel with the communication apparatus 10'. The designator 64 designates a communication channel in the same manner as the designator 14.

MODIFICATION EXAMPLE 2

Whereas the first exemplary embodiment is directed to the wireless multi-hop network which is in actual operation, in practice the concept of the first exemplary embodiment may be employed in a simulator or the like at a planning stage. The simulator provisionally employs all communication apparatus as candidates for the second communication apparatus 30 having the second communicator 33 and installs a communication apparatus equipped with the second communicator 33 at such a potion that a communication channel that minimizes the maximum number of hops can be realized (in the example of FIG. 2, a node equipped with the second communicator 33 is installed in advance at the position of node N1). This provides such an advantage that if it has been determined that for the purpose of preparing for a failure, a prescribed number of second communication apparatus 30 having the second communicator 33 are normally provided, their installation positions can be utilized for optimization of the wireless broadcast communication.

The first exemplary embodiment can shorten a time taken to transmit a message from a start point communication terminal to an end point communication terminal while avoiding message congestion when the message is transmitted in a wireless multi-hop network. In the first exemplary embodiment, congestion is less prone to occur in wireless sections because a radio congestion preventive measure such as RFC6206 (e.g., introduction of a random waiting time which is shorter than a prescribed time) is taken for the wireless broadcast communication. Furthermore, the designator 14 designates a communication apparatus as a destination of a communication channel to be established according to an actual network topology managed by the designator 14. Therefore, a requirement relating to a maximum time to reach a destination of the wireless broadcast communication can be satisfied at a high probability. It is possible to assure satisfaction of a demanded specification relating to the number of hops at a certain end point. Still further, the first exemplary embodiment causes no interference with standard techniques because the first communicator 32 and the relay processor 23 or the unidirectional relay processor 34 operate according to a wireless multi-hop standard (e.g., RFC6206).

In the first exemplary embodiment, communication apparatus (adjacent nodes) with which the first communicator 12 can communicate in a wireless multi-hop network are communication apparatus that are located within a wireless communication range of the first communicator 12. However, the invention is not limited thereto. Where a setting is made in advance so that the first communicator 12 is allowed to communicate wirelessly with only prescribed ones of the communication apparatus located within the wireless communication range of the first communicator 12, the adjacent nodes are the communication apparatus (wireless-communication-allowed communication apparatus) with which the first communicator 12 is allowed to perform the wireless communication. In this case, the first communicator 12 sends out a message to only the wireless-communication-allowed communication apparatus by the wireless broadcast communication. Also, in this case, candidates for a communication apparatus with which the second communicator 13 is to establish a communication channel include not only communication apparatus located outside the wireless communication range of the first communicator 12 but also communication apparatus with which the first communicator 12 is not allowed to communicate wirelessly and communication apparatus with which it is difficult for the first communicator 12 to communicate wirelessly. In this connection, for example, such a method is available that the prescribed communication apparatus with which the first communicator 12 is allowed to communicate wirelessly are restricted to communication apparatus that share the same identifier with the transmitting apparatus 10. This type of restriction is employed in a case where it is desired to send out a message only to prescribed communication apparatus for a security-related reason. In this manner, adjacent nodes may be determined in advance from among communication apparatus with which a transmitting apparatus can communicate wirelessly. Second-hop nodes and further downstream nodes may also be determined in advance.

<Second Exemplary Embodiment>

Figure 12:
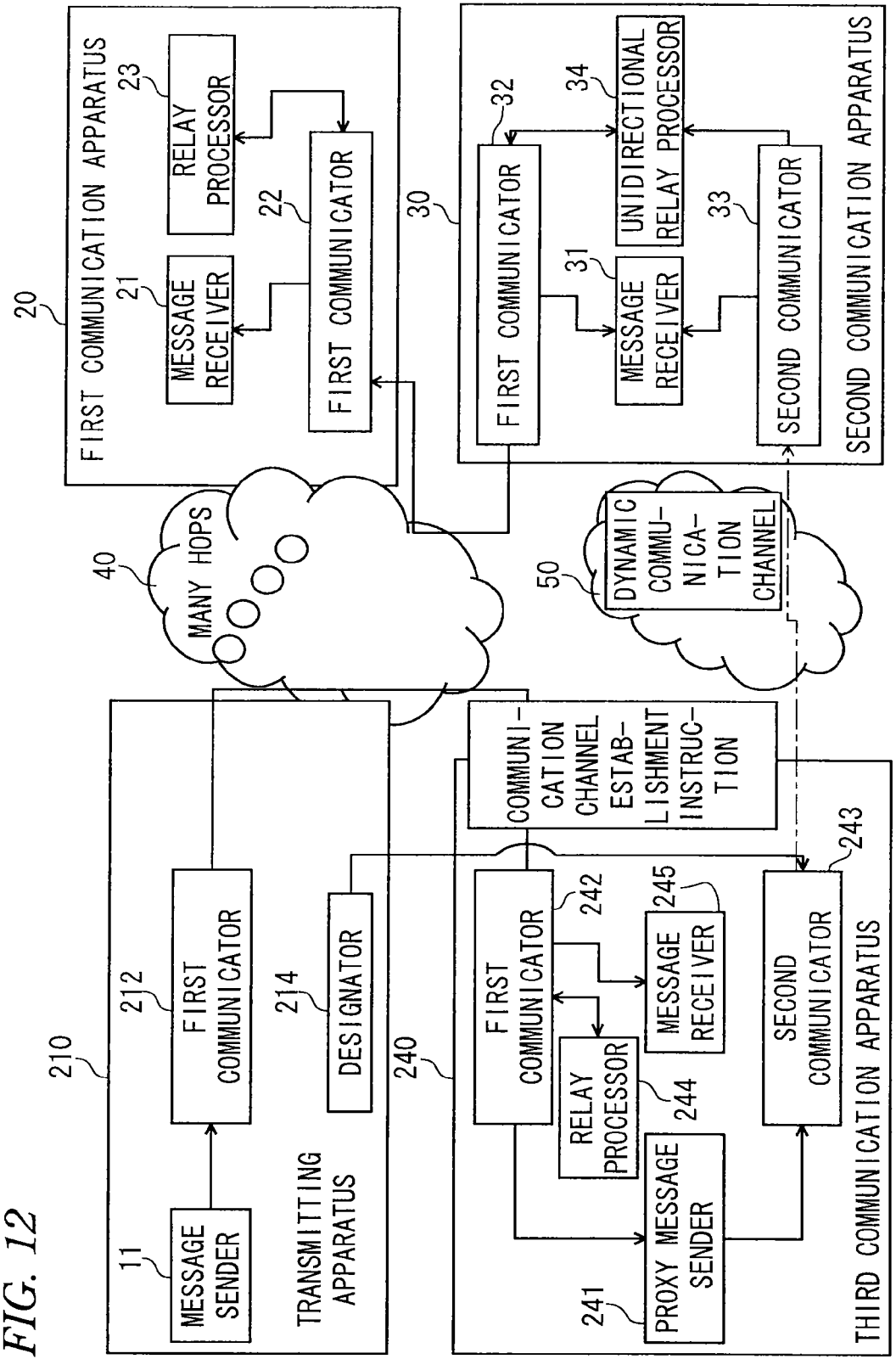
FIG. 12 is a block diagram of a communication system according to a second exemplary embodiment of the invention.

FIG. 12 is a block diagram of a communication system according to a second exemplary embodiment.

The communication system according to the second exemplary embodiment is different from that according to the first exemplary embodiment in that a transmitting apparatus 210 of the second exemplary embodiment does not include the second communicator 13 and that the communication system according to the second exemplary embodiment is provided with a third communication apparatus 240.

A designator 214 of the transmitting apparatus 210 instructs a second communicator 243 of the third communication apparatus 240 to establish a communication channel with the second communicator 33 of the second communication apparatus 30. The second communicator 243 has the same functions as the second communicator 13 shown in FIG. 1. The designator 214 has approximately the same functions as the designator 14 shown in FIG. 1 except that the designator 214 issues an instruction to the external second communicator 243. The designator 214 designates, as the second communication apparatus 30 with which the second communicator 243 is to establish a communication channel, a communication apparatus that at least is located outside (for example, farther than) a wireless communication range of a first communicator 242 and that has a communicator capable of establishing a communication channel with the second communicator 243.

The first communicator 212 of the transmitting apparatus 210 sends out a message to the first communicator 242 of the third communication apparatus 240 by the wireless broadcast communication.

Upon receiving the message, the first communicator 242 of the third communication apparatus 240 notifies the received message to a proxy message sender 241. The first communicator 242 also sends the received message to a message receiver 245 (the message receiver 245 performs the same processing as the message receiver 21 shown in FIG. 1). Furthermore, the first communicator 242 sends out the received message by the wireless broadcast communication under the control of a relay processor 244 (this control executed by the relay controller 244 is the same as the control executed by the relay processor 23 shown in FIG. 1).

The proxy message sender 241 sends out the received message to the second communicator 33 of the second communication apparatus 30 over the communication channel established by the second communicator 243.

Where a transmitting apparatus serving as a start point of transmission of a message does not include a second communicator, the communication system according to the second exemplary embodiment can transmit the message by causing the third communication apparatus 240 (which is located near (e.g., one hop away from) the transmitting apparatus and is equipped with a second communicator) to serve as a proxy of the transmitting apparatus to establish a communication channel between the second communicator and the second communication apparatus 30 which is located at a distant position (e.g., distant by two hops or more).

The communication system according to the second exemplary embodiment can also provide the same advantages as that of the first exemplary embodiment.

For example, the transmitting apparatus 10 can also be implemented by using a general-purpose computer as basic hardware. That is, the message sender 11, the first communicator 12, the second communicator 13, and the designator 14 can be implemented by causing a processor of that computer to run programs. In this case, the transmitting apparatus 10 may be implemented either by pre-installing the programs in the computer or by, when necessary, installing in the computer the programs stored in a storage medium, such as a CD-ROM or the programs delivered over a network.

For example, the second communication apparatus 30 can also be implemented by using a general-purpose computer as basic hardware. That is, the message receiver 31, the first communicator 32, the second communicator 33, and the unidirectional relay processor 34 can be implemented by causing a processor of that computer to run programs. In this case, the second communication apparatus 30 may be implemented either by pre-installing the programs in the computer or by, when necessary, installing in the computer the programs stored in a storage medium, such as a CD-ROM or the programs delivered over a network.

For example, the managing apparatus 60 can also be implemented by using a general-purpose computer as basic hardware. That is, the designator 64 can be implemented by causing a processor of that computer to run programs. In this case, the managing apparatus 60 may be implemented either by pre-installing the programs in the computer or by, when necessary, installing in the computer the programs stored in a storage medium, such as a CD-ROM or the programs delivered over a network.

<Other Exemplary Embodiments>

Other exemplary embodiments will be described below.

According to a third exemplary embodiment, a receiving apparatus includes a first communicator, a second communicator, and a relay processor. The first communicator is configured to receive a message by wireless broadcast communication from a first communication apparatus, which is located within a wireless communication range of the first communicator, of plural communication apparatus that constitute a wireless multi-hop network and have a wireless broadcast communication function. The second communicator is configured to receive the message from a second communication apparatus of the plural communication apparatus having a wireless broadcast communication function over a communication channel that has been established with the second communication apparatus. The second communication apparatus is wider in communication range than the first communicator, the second communication apparatus with which a communication channel can be established. The relay processor is configured to cause at least one of the first communicator and the second communicator to stand by after the reception of the message, and then to cause the first communicator to send out the received message and prohibit the second communicator from sending out the receive message.

According to a fourth exemplary embodiment, a non-transitory computer readable storage medium stores a program that causes a computer to execute a process of transmitting a message. The process includes: causing a first communicator to send out a message by wireless broadcast communication to plural first communication apparatus, being located within a wireless communication range of the first communicator, of plural communication apparatus that have a wireless broadcast communication function and that constitute a wireless multi-hop network; designating a second communication apparatus that is located outside the wireless communication range of the first communicator and that can establish a first communication channel, from among the plural communication apparatus having a the wireless broadcast communication function; and causing a second communicator to establish the first communication channel with the designated second communication apparatus and to send out the message over the established first communication channel, the second communicator being wider in a communication range than the first communicator.

At least one of the above-described exemplary embodiments provides the advantage that in transmission of a message in a wireless multi-hop network, a time taken to transmit the message from a start point communication terminal to an end point communication terminal can be shortened while message congestion is avoided.

Although the exemplary embodiments have been described above, they are just examples and are not intended to limit the scope of the invention. These novel exemplary embodiments may be practiced in various other forms. A part of the exemplary embodiments may be omitted, replaced by other elements, or changed in various manners without departing from their spirit and scope. Such modifications are also included in the scope of the embodiments and their equivalents.

What is claimed is:

1. A transmitting apparatus comprising:
   a first communicator configured to send out a message by wireless broadcast communication to a first communication apparatus, being located within a wireless communication range of the first communicator, of plural communication apparatus that have a wireless broadcast communication function and that constitute a wireless multi-hop network;
   a designator configured to designate a second communication apparatus that is located outside the wireless communication range of the first communicator and that can establish a first communication channel, from among the plural communication apparatus having a the wireless broadcast communication function; and
   a second communicator configured to be wider in a communication range than the first communicator, to establish the first communication channel with the second communication apparatus designated by the designator and to send out the message over the established first communication channel,
   wherein each of the first communication apparatus and the second communication apparatus stands by after reception of the message, and then sends out the received message by the wireless broadcast communication if a prescribed condition is met and does not sent out the received message if the prescribed condition is not met.

2. The apparatus of claim 1, wherein the designator designates the second communication apparatus based on (i) at least one of (a) a first upper limit time of times to be taken for the message to reach a prescribed number or more of communication apparatus of the plural communication apparatus that constitute the wireless multi-hop network and that have the wireless broadcast communication function and (b) a first upper limit number-of-apparatus that is a number of communication apparatus the message is allowed to go through until reaching the prescribed number or more of communication apparatus and (ii) a network topology of the wireless multi-hop network.

3. The apparatus of claim 2, wherein the at least one of the first upper limit time and the first upper limit number-of-apparatus is determined in advance externally.

4. The apparatus of claim 1, wherein the designator designates, as the second communication apparatus, a communication apparatus that is located at a position corresponding to ⅔ of a maximum value of numbers of communication apparatus the message goes through until reaching a prescribed number or more of communication apparatus of the plural communication apparatus that constitute the wireless multi-hop network and that have the wireless broadcast communication function.

5. The apparatus of claim 1, wherein the second communicator is implemented by using a virtual link on the first communicator.

6. The apparatus of claim 1, wherein the second communicator does not send out the received message over the established communication channel.

7. A transmitting apparatus comprising:
   a first communicator configured to send out a message by wireless broadcast communication to a first communication apparatus, being located within a wireless communication range of the first communicator, of plural communication apparatus that have a wireless broadcast communication function and that constitute a wireless multi-hop network; and a designator configured to instruct a third communication apparatus, including a second communicator that can establish a first communication channel and that is wider in communication range than the first communicator, to establish the first communication channel with a second communication apparatus of the plural communication apparatus having a wireless broadcast communication function, the second communication apparatus being located outside the wireless communication range of the first communicator, the second communication apparatus with which the first communication channel can be established, wherein each of the first communication apparatus and the second communication apparatus stands by after reception of the message, and then sends out the received message by the wireless broadcast communication if a prescribed condition is met and does not send out the received message if the prescribed condition is not met.

8. A managing apparatus comprising:

a designator configured to instruct a transmitting apparatus including a first communicator configured to send out a message by wireless broadcast communication to a first communication apparatus, being located within a wireless communication range of the first communicator, of plural communication apparatus that constitute a wireless multi-hop network and that have a wireless broadcast communication function, and a second communicator configured to establish a first communication channel, to be wider in communication range than the first communicator, and to send out the message over the first communication channel, to establish the first communication channel with a second communication apparatus of the plural communication apparatus, the second communication apparatus being located outside the wireless communication range of the first communicator, the second communication apparatus with which the first communication channel can be established, wherein each of the first communication apparatus and the second communication apparatus stands by after reception of the message, and then sends out the received message by the wireless broadcast communication if a prescribed condition is met and does not sent out the received message if the prescribed condition is not met.

9. The apparatus of claim 8, wherein the designator designates the second communication apparatus based on (i) at least one of (a) a first upper limit time of times to be taken for the message to reach a prescribed number or more of communication apparatus of the plural communication apparatus that constitute the wireless multi-hop network and that have the wireless broadcast communication function and (b) a first upper limit number-of-apparatus that is a number of communication apparatus the message is allowed to go through until reaching the prescribed number or more of communication apparatus and (ii) a network topology of the wireless multi-hop network.

* * * * *